A. BARR & W. STROUD.
RANGE AND DEFLECTION COMPUTER.
APPLICATION FILED DEC. 30, 1910.
1,147,358.
Patented July 20, 1915.
2 SHEETS—SHEET 1.
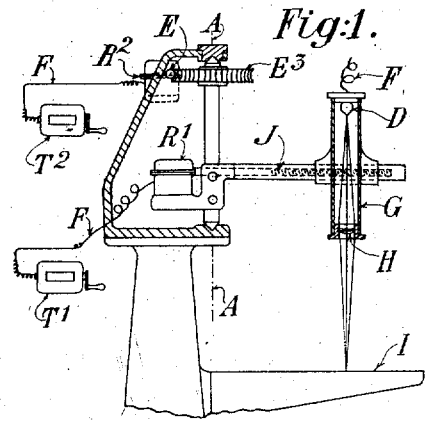
Fig: 1.
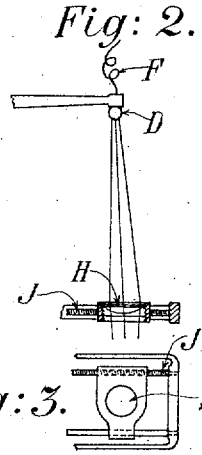
Fig: 2.
Fig: 3.
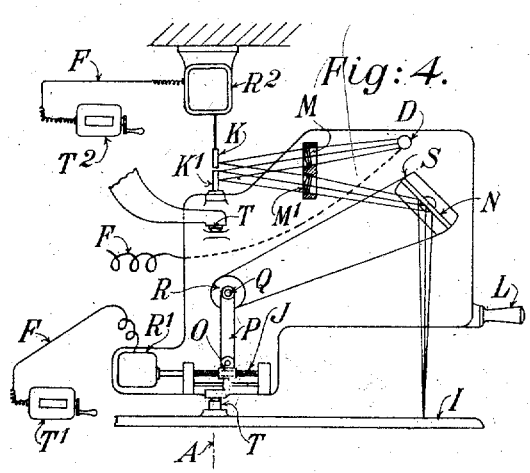
Fig: 4.
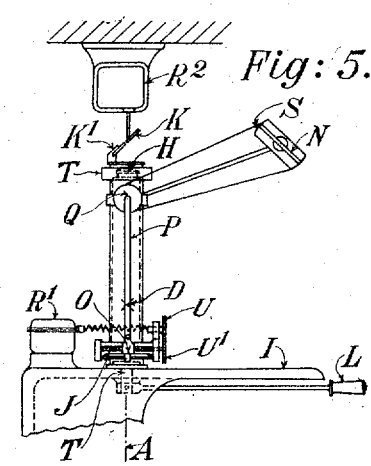
Fig: 5.
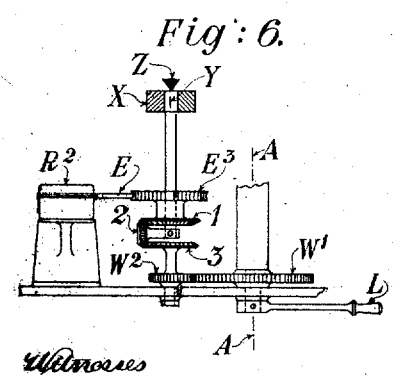
Fig: 6.
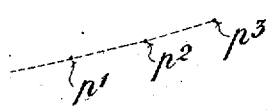
Fig: 12.
Witnesses
Chas. H. Smith
Inventors
Archibald Barr
William Stroud
by Harold Terrell
their atty

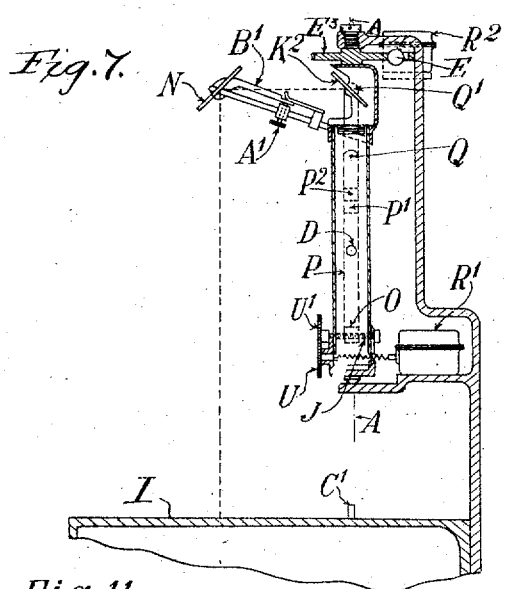
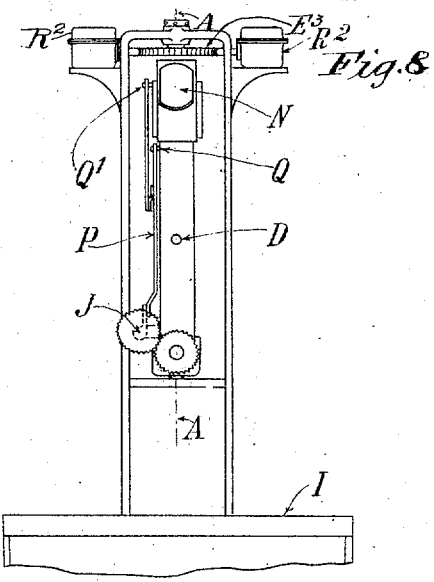
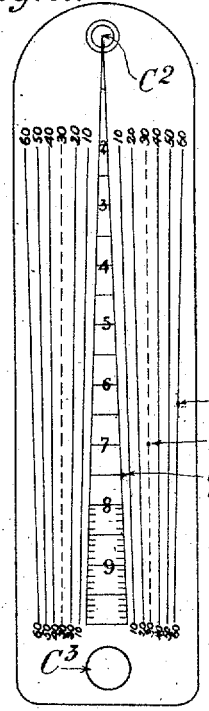
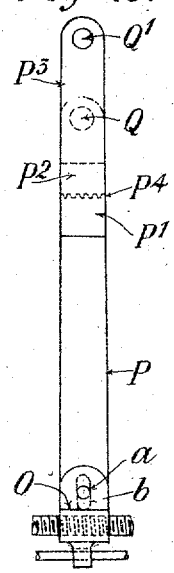
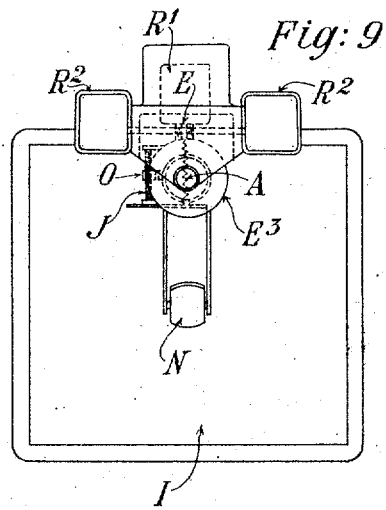

UNITED STATES PATENT OFFICE.

ARCHIBALD BARR AND WILLIAM STROUD, OF ANNIESLAND, GLASGOW, SCOTLAND, ASSIGNORS TO BARR AND STROUD, LIMITED, OF ANNIESLAND, GLASGOW, SCOTLAND.

RANGE AND DEFLECTION COMPUTER.

1,147,358.   Specification of Letters Patent.   Patented July 20, 1915.

Application filed December 20, 1910. Serial No. 600,125.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented new and useful Improvements in Range and Deflection Computers, (for which we have made application for a patent in Great Britain, No. 1,053, bearing date January 15, 1910,) of which the following is a specification.

By the usual method of setting the sights of guns in fortresses and in battleships it is necessary not only to know the range of the enemy but to know as well the magnitude and direction of the velocity of the target relatively to the gun-platform so that the gun-sight may be set to correspond to the probable position of the target at a short time subsequent to that at which the sights are set. In other words, it is necessary, as far as possible, to predict the position of the target a fraction of a minute in advance. This may be done by marking off the bearing and the range of the target at equal intervals of time upon a chart or plotting table furnished with a pivoted arm moving over an angle scale marked with the bearings, such arm being provided with a uniform range-scale (whose zero is at the center of rotation). In this way the bearing and the range of the target being known, say, at quarter-minute intervals, the motion of the target relatively to the gun-platform can be represented and the results may be employed for purposes of prediction.

The object of our invention is to provide means for enabling indications to be made (and, if desired, recorded upon a surface) of the position of a distant object relative to a station, under conditions where the range and bearing of the object relative to the station are ascertainable at the station, and when the object or the station is in motion, or when both are in motion, to enable a progressive indication or a series of such indications to be made and recorded, in order that the probable position of the object relative to the station at a subsequent time may be deduced; this invention in application being particularly adapted for use in determining the required setting of ordnance sights and the like.

According to this invention a position indicator and a table are provided, and provision is made for imparting to the position indicator or to the table, a movement consisting of motions corresponding to the change of bearing and proportional to the change of distance of the object in relation to a datum position representing the station on the surface of the table, or to impart to the position indicator either the bearing or the distance motion, while imparting to the table the complementary motion required to produce the required movement, and further, to effect the required motions by automatic or semi-automatic actuation.

In carrying this invention into practice a visual or luminous indication is produced.

Some examples of construction, embodying the features of our invention, will now be described.

In one form of apparatus particularly applicable for use at a fortress the apparatus may comprise, (1) a range transmitter and receiver, (2) a bearing transmitter and receiver, (3) an optical device (hereinafter called the projector) capable of being set as hereinafter described in accordance with the range and bearing of the enemy, and (4) a table or chart upon the surface of which the image of a luminous or opaque mark or indication formed by the optical device is projected.

The projector consists essentially of an illuminated cross-wire, hole, or other mark, and a lens so disposed with reference to the table that an image of the mark is projected on the table. By suitable motions of the mark, or the lens, or of both, the image on the table can be shifted so as to correspond to the shift in bearing and range of the target. Reflectors may, if desired, be used in connection with the projector and in some cases motions of such reflectors may be used to replace motions of the mark or lens. Further, the whole projector may be so mounted and supported as to be capable of rotation about, say, an axis A perpendicular to the plane of the table. The table which we may suppose to be horizontal (though that position is not essential) is placed, let us suppose, below the projector with a datum position representing the station of observation in the prolongation of the axis A.

As range or bearing indicators we may employ apparatus of the step-by-step kind, for example, of the construction described in the specification of our Patent No. 1009013, dated 14th November, 1911, but it is to be understood that we do not confine ourselves to instruments of this class since almost any type of indicating apparatus (whether of the step-by-step type or not) can be employed as a component part of our complete apparatus. However, for brevity we shall assume that an electrical step-by-step transmitter is employed for sending signals of changes in range to a corresponding step-by-step receiver, and that a second step-by-step transmitter is simultaneously employed for sending signals of changes in bearing to a corresponding step-by-step receiver. It is supposed in the first instance that these two receivers are powerful enough to operate the projector mechanically and sufficiently rapid in action to follow the motions of their respective transmitters. In this case the range transmitter $T^1$ is electrically connected to a range receiver $R^1$ which for example, may be of the type described in the specification of our prior Patent Number 1,009,013, dated November 14, 1911, associated with mechanism by means of which the actuation of the range receiver, $R^1$, mechanically operates the projector so as to produce a radial motion of the image of the mark on the table to and from the axis A, the gearing being such that (with or without the intervention of a cam or other rectifying gear) a change of range of 100 yards shall correspond to a radial motion of the image on the table of a constant amount. This radial motion of the image of the mark can be produced in a large variety of ways, for example, the mark may be fixed radially and the lens may be moved radially by the actuation of the range receiver $R^1$, or the lens may be fixed radially, and the mark may be moved radially by the actuation of the range receiver $R^1$, or both lens and mark may be simultaneously moved radially by the actuation of the range receiver $R^1$, or again, the lens and mark may be fixed radially and a reflector may be interposed in the path of the beam of light coming from the mark, and this reflector may be rotated by the actuation of the range receiver $R^1$ so as to produce the radial motion of the image of the mark. If, as the result of spotting observations or otherwise, it is found that the range requires to be altered by a specified amount, we may do this by radially shifting the mark to the appropriate extent by hand, the lens being radially shifted by the range-receiver, or vice versa. In addition the bearing transmitter $T^2$ is similarly electrically connected to a bearing receiver $R^2$ which is geared to the projector so as to produce rotation about the axis A, the gearing being such that a change of bearing of 1° corresponds to a rotation of the projector through 1° and in the appropriate sense. It will be understood that the projector or its optical axis is thus moved in two dimensions, namely, first radially by the range receiver $R^1$, and secondly, about the axis A, (or azimuthally) by the bearing receiver $R^2$. Thus, if the observations of the range and bearing are correct and are correctly transmitted to the projector, the image of the mark upon the table will indicate the location of the target relatively to the gun-platform whose position on the table will be at the point of intersection of the axis A with the table. Instead of imparting the azimuthal motion to the projector we may, if desired, (though that is generally not so convenient) fix the projector azimuthally, and rotate the table in azimuth by means of the bearing receiver $R^2$.

Instead of imparting the azimuthal and radial motions to the projector automatically we may do so semi-automatically by which we mean that we employ at the plotting table the coöperation of an observer, who, without reading the transmitted range, or bearing, can adjust either the radial or azimuthal positions of the projector, or both, so that these positions are in conformity with the transmitted range and bearing by means of a suitable visual signal, e. g., to take the case of the bearings receiver and employing the step-by-step type of receiver, we may provide a differential gear consisting of three elements 1, 2, 3, in which the algebraical sum of the motions of 1 and 3 is communicated to the element 2. Associated with this differential gear there may be a drum which is moved directly by the motion of the element 2, the element 1 being connected to the bearings receiver $R^2$ (which is driven electrically by the bearings transmitter $T^2$) and the element 3 being adjustable by hand by means of gearing which is mechanically connected to the apparatus which rotates the projector azimuthally. In this way the drum is worked simultaneously or separately by the transmitter and the hand-adjuster so that we may arrange that the motion of the transmitter $T^2$, through the operation of the receiver, $R^2$ is (so far as the drum is concerned) annulled by the motion of the hand-adjustment. Thus we can arrange that the hand-adjustment "wipes out" the effect produced upon the drum by the receiver R² due to operation of the transmitter if we bring the drum always to a certain definite standard position. By these means the motion of the hand-adjustment becomes a measure of the motion of the receiver R² and therefore of the transmitter T².

Another plan is to use the "follow the pointer" method, or we may use the device of "following the line," both of which devices are already known.

By either of these methods we can arrange that the amount of work to be done by the receivers shall not be very much greater than that required for the transmission of visual signals, and thus we are enabled to use a small receiver capable of following very rapid steps made by the transmitter.

We can, however, arrange the apparatus so that the observer can set the projector to the correct bearing without the provision of any mechanical connection between the bearing receiver and the projector. In this case we may suppose the bearing receiver to be mounted above the table and arrange that this receiver shall rotate a reflector K about an approximately vertical axis. The projector will now be arranged so as to be capable of rotation about the axis A, and rigidly attached to the projector we may provide a lamp and suitably placed lens or lenses and reflector or reflectors so that an image of the lamp is, after reflection from K, projected on the table. This image we shall call the bearing image. We may next provide a mark rigidly attached to the projector and, say, just over the table, and so dispose the reflectors and lenses that, when the projector is correctly adjusted for bearing, the bearing image falls upon this mark. If now the bearing receiver produces a rotation of the reflector K the bearing image will no longer fall upon the mark, but by rotating the projector we can bring the image upon the mark again, in which case the projector will be correctly set with reference to the bearing receiver. We may still further simplify the operation of using the instrument by arranging that the projector is correctly set with reference to the bearing receiver when the bearing image is brought into contact with the target image. In this case the bearing image may be a long radial line, and the target image may consist of two intersecting lines so that the projector may be correctly set by rotation about the axis A until the radial bearing line passes through the point of intersection of these lines. To avoid the necessity of providing a long radial line as bearing image we may provide a short radial line, and arrange the gear to move the bearing image toward or from the center of the table. Thus, for example, we may provide a mechanical gear to rotate one of the reflectors attached to the projector through a suitable amount. Thus the operation of locating the position of the target on the plotting table can easily be effected as follows:—If the projector is somewhere near the correct position an observer will see a cross upon the table indicating the target image, and a short radial line indicating the bearing image. By suitable motions of the arm of the projector the short radial line may be moved azimuthally and radially so as to pass through the center of the target image, and the common point of intersection of the three lines gives the location of the target. For use on battleships instead of in fortresses we may provide a magnetic or gyroscopic compass, say, at the center of the table which may be mounted so as to be capable of rotation about an axis coincident with the axis A aforesaid. The table may be provided with a mark or lubber-line so that it may be turned by hand (or controlled by the compass) so as to preserve the same azimuthal position with reference to the compass.

In order that our invention may be properly understood we have hereto appended two sheets of drawings in the several figures of which corresponding parts where these occur are marked with corresponding letters of reference.

Figure 1 is an elevation partly in section of an instrument constructed according to this invention. Fig. 2 is a side elevation partly in section. Fig. 3 is a plan view illustrating a modification which may be made in the instrument shown at Fig. 1. Figs. 4, 5 and 6, are elevations each illustrating an instrument of modified construction. Fig. 7 is a side elevation partly in section. Fig. 8 is a front elevation. Fig. 9 is a plan view illustrating an instrument constructed according to a further modification of this invention. Fig. 10 is a side elevation of a part of the mechanism of the instrument illustrated in Figs. 7, 8 and 9. Fig. 11 is a plan view of a scale adapted for use in conjunction with instruments constructed according to this invention. Fig. 12 illustrates a series of markings to be hereinafter referred to.

In all the figures A A represents the axis of rotation, R¹ a range receiver, R² a bearings receiver, D a lamp, E E³ worm and worm-wheel and F flexible leads.

In all cases the lamp may be selected and so adjusted in its socket that two portions of the image of the incandescent filament intersect and this point of intersection may be taken as indicating the target.

Fig. 1 represents an automatic arrangement for moving the spot of light radially and azimuthally. The bearings receiver R² by means of a worm E and worm-wheel E³ rotates the frame about A A. The range receiver R¹ is mounted on the frame and is connected by flexible leads F to a distant range-transmitter $T^1$. G is a vertical tube carrying a lamp D at the upper end and a lens H at the lower, the focal length of this lens being chosen so as to form an image of the lamp on the table I. This projector is translated bodily to and from the axis A A by means of a screw J connected to the shaft of $R^1$.

Fig. 2 shows an alternative arrangement in which D is fixed at a certain radial distance from A A while the lens H alone is operated by the range-receiving mechanism. D and H are supposed to be mounted to a frame capable of being rotated about A A just as shown in Fig. 1. In this figure the table is not shown.

Fig. 3 shows a plan of the mechanism for operating the lens H shown in Fig. 2.

In the two methods so far illustrated the bearings receiver has to rotate a frame possessing considerable inertia and consequently unless the bearings receiver is very powerful and the rate of change of bearings comparatively slow, there will be a likelihood of the receiver missing step.

In Figs. 4 and 5 we have examples of methods in which the bearings receiver has next to no work to do. It merely has to rotate a plane mirror K situated vertically in Fig. 4 and at 45° to the vertical in Fig. 5. In these cases the frame is mounted in bearings or pivots T T and is turned about A A by the handle L by the operation of which the observer brings a mirror $K^1$ attached to the frame into parallelism with the mirror K attached to the bearings receiver. This can readily be done by observing the image (or images) of D upon the table. If K and $K^1$ are parallel there will be only one image, so that if two images are seen L must be operated so as to make these two images overlap.

In Fig. 4 the light from D after traversing the lens M emerges (say) as a parallel beam, is reflected partly by K and partly by $K^1$, and then traverses the lens $M^1$ and is subsequently reflected downward on to the table by the mirror N. In the case illustrated by Fig. 4, $R^1$ is mounted on the frame as in Fig. 1 but the range-indicating mechanism is slightly modified. $R^1$ operates a screw J which moves a nut O. Forked into a pin on this nut is an arm P working about a pivot Q fixed to the frame. To P is attached the pulley R which is connected by bands to a frame S the outer surface of which may be formed as a complete or partial pulley which carries the mirror N, so that a partial rotation of the pulley, R, will cause a partial rotation of the mirror, N. The radius of S is made twice that of R which is the condition necessary to be satisfied so as to give a uniform range-scale upon the table.

Fig. 5 differs from Fig. 4 (1) in having the mirrors K, $K^1$ inclined at 45° to the vertical (2) in having the lamp D and lens H inclosed in a central tube (3) in having $R^1$ fixed to the table and in communicating the motion of its shaft by a flexible coupling to the toothed wheel U which gears into $U^1$ operating the nut O by means of the screw J. R and S are operated as shown and described under Fig. 4.

Fig. 6 shows a mechanical method (in place of the optical method of two mirrors described under Figs. 4 and 5) for bringing the frame into conformity with the bearings indication. $R^2$ through a worm E and wheel $E^3$ operates one element 1 of a differential gear, the other element 3 of which is operated by the handle L through the toothed wheels $W^1$ and $W^2$. The intermediate element 2 of the differential gear is attached to the drum X which has a mark Y upon it. If now the bearings receiver $R^2$ causes 1 to rotate, the drum X will rotate through half the angle but by rotating the handle L we can bring back the drum to its original position with the mark Y opposite the fixed index Z. Thus the rotation of the handle L may be made to "wipe out" the effect of the operation of the bearings receiver and thus becomes a measure of the indication of the latter. The gearing is such that 1° rotation of L about A A corresponds to 1° alteration in the bearing.

Figs. 7, 8 and 9 show (in greater detail) side elevation, front elevation and plan of a form of plotting table working automatically in which the inertia of the parts moving around the axis A A is considerably reduced. All the parts are arranged close to the axis A A except the single mirror N which is fixed except for azimuthal motion, the range-indicating mirror being $K^2$. As shown in Fig. 8 two bearings receivers $R^2$ $R^2$ are used so as to double the power available for producing rotation about the axis A A. The range-receiver $R^1$ is stationary and the motion of its shaft is communicated by a flexible coupling to the toothed wheel U gearing with the toothed wheel $U^1$ which operates a nut O.

Fig. 10 shows on a larger scale the means whereby the nut O rotates the mirror $K^2$ so as to give a uniform range-scale upon the table. The nut O has a pin $a$ which gears into a short slot $b$ in the arm P whose pivot is Q. Attached to the arm P is a part of an internal toothed wheel $P^1$ which gears into a part of a wheel $P^2$ fastened to the arm $P^3$ whose pivot is $Q^1$. The point Q is arranged to be midway between $Q^1$ and $P^4$, the pitch line of $P^1$ and $P^2$, respectively, so that as P is rotated through a certain angle $P^3$ is rotated thereby through half the angle. The mirror $K^2$ (Fig. 7) is attached to $P^3$. On the arm which supports the mirror N is a screw $A^1$ operating upon an arm $B^1$ attached to the mirror N. This is intended for the purpose of initial adjustment of the range.

In Fig. 11 is shown the form of scale employed for reading the predicted range and the amount of deflection to be allowed. This scale made of celluloid or other transparent material has two radial scales of ranges, diverging from the point $C^2$ which corresponds to zero range. Concentric with the point $C^2$ is a metal ring and at the other end of the scale is a handle knob $C^3$. On the table I (Fig. 7) concentric with the axis A A is a stud $C^1$ which is made to fit the aperture in $C^2$ (Fig. 11). To use this scale we place it upon the table so that it can swing around $C^1$ as a center and we proceed to mark off upon the table the position of the target at equal intervals of time as shown by the position of the luminous image. Let $p^1$ (Fig. 12) be one such position, $p^2$ a later position, say, after a quarter of a minute then we predict that the target will be at $p^3$ after a lapse of another quarter of a minute. To read off the range of $p^3$ we swing around the scale shown in Fig. 11 till $p^3$ falls under one of the two radial lines indicating the range and from its position on this scale the range can be read off.

In Fig. 11 there will be seen to the right of the right radial lines a series of six lines almost straight and nearly parallel to the radial line itself, but with a slight convergence somewhat as shown. These lines would be strictly parallel to the radial line if the time of flight of the shot were strictly proportional to the range, but as the time of flight increases more rapidly than the range it is necessary to make the lines converge to the requisite amount as the range increases. The first of these lines may be regarded as the 10 knot line, the second the 20 knot and so on. Similarly to the left of the left hand radial line is a set of six lines the exact counterpart of those just described. To read off the appropriate deflection we will suppose that the scale shown in Fig. 11 is *in situ* on the plotting table, that $q^1$, $q^2$ are two successive plots and $q^3$ the predicted plot. We swing around the scale till the right radial line falls upon $q^3$ and we read off the predicted range as 7500 the position of $q^2$ among the deflection lines gives the amount of deflection to be allowed—in this example 30 knots. In this case the image of the target is moving to the left on the paper; if the image had been moving to the right we should have used the left hand set of deflection lines in the same way. These deflection lines are constructed to suit a particular set of range tables corresponding to a particular gun in the following manner:—Suppose the shot takes 10 seconds to cover 7000 yards, then with a differential relative velocity of 10 knots or 5.6 yards per second at right angles to the line of sight the shot would fall 56 yards wrong azimuthally if no deflection correction were allowed. Suppose now the scale of the plotting table be 2 inches per 1000 yards then 56 yards will correspond to 0.11" on the plotting table and at the 7000 yards mark on the scale the 10 knot deflection line should be 0.11" distant from the radial line. The 20 knot line will be 0.22" distant and so on. In the same way these distances can be calculated for other ranges.

It will thus be seen that a set of deflection lines is suitable for one type of gun. For a different type of gun we shall require a separate scale or we may adopt the procedure of using only one scale and altering the graduation of the deflection scale of the different type of gun so as to suit the plotting table scale.

In the use of the apparatus upon battleships the differential or relative velocity of battleship and target will be given from the plottings at equal time-intervals of the position of the target on the chart.

Our present invention is equally applicable when the apparatus for the electrical transmission and reception of the changes in range and bearing is replaced by mechanical connections. The apparatus can also be used by providing means for moving the projector by hand in accordance with the ascertained range and bearing which may have been communicated to the operator by visual or audible signals.

What we do claim as our invention, and desire to secure by Letters Patent, is:—

1. A table having a surface upon which one point represents a station of observation, in combination with a source of light and means for producing upon the aforesaid surface an image of the source of light associated with means for effecting a movement between the image and the surface, said movement consisting of two distinct component motions, one an azimuthal motion corresponding to change of bearing, the other a radial motion proportional to change of range, each in relation to an object with reference to the aforesaid point.

2. A table having a surface upon which one point represents a station of observation, in combination with a source of light and means for producing an image of the source of light upon the aforesaid surface associated with means for imparting to the means for producing the image two distinct motions, one an azimuthal motion corresponding to change of bearing, the other a radial motion proportional to change of range, each in relation to an object with reference to the aforesaid point.

3. A table having a surface, a datum position on the surface representing a station of observation, in combination with a source of light and means for producing an image of the source of light upon the said surface comprising an oscillatory mirror, means for imparting a motion to the mirror to produce a movement of the image radially from the datum position and proportional to the change of range of an object in relation to the station of observation, and means for effecting a rotary movement about the datum position between the image and the surface corresponding to the change of bearing of the object in relation to the station of observation.

4. A table having a surface, a datum position on the surface representing a station of observation, in combination with a source of light and means for producing an image of the source of light upon the said surface comprising an oscillatory mirror, means for imparting a motion to the mirror to produce a movement of the image radially from the datum position and proportional to the change of range of an object in relation to the station of observation, and means for imparting a rotary motion about the datum position to the means for producing the image corresponding to the change of bearing of the object in relation to the station of observation.

5. A table having a surface, a datum position on the surface representing a station of observation, in combination with a source of light and means for producing an image of the source of light, a mirror set to revolve about an axis perpendicular to the surface and passing through the datum position, upon which mirror the rays forming the image are projected and by which they are reflected, a second mirror mounted at a distance from the axis and arranged to reflect the image upon the aforesaid surface, one of the mirrors being mounted to oscillate so as to produce a movement of the image radially from the datum position, means for imparting an oscillatory motion to that one mirror proportional to the change of range of an object in relation to the station of observation, and means for effecting a rotary movement about the datum position between the image and the surface corresponding to the change of bearing of the object in relation to the station of observation.

6. A table having a surface, a datum position on the surface representing a station of observation, in combination with a source of light and means for producing an image of the source of light, a mirror set to revolve about an axis perpendicular to the surface and passing through the datum position upon which mirror the rays forming the image are projected and by which they are reflected, a second mirror mounted at a distance from the axis and arranged to reflect the image upon the aforesaid surface, one of the mirrors being mounted to oscillate so as to produce a movement of the image radially from the datum position, means for imparting an oscillatory motion to that one mirror proportional to the change of range of an object from the station of observation, and means for effecting a rotary movement of the two mirrors, about the axis passing through the datum position and perpendicular to the surface, corresponding to the change of bearing of the object in relation to the station of observation.

7. A table having a surface, a datum position on the surface representing a station of observation, in combination with a source of light and means for producing an image of a source of light, an oscillatory mirror set to revolve about an axis perpendicular to the surface and passing through the datum position upon which mirror the rays forming the image are projected and by which they are reflected, a second mirror mounted at a distance from the axis and arranged to reflect the image upon the aforesaid surface, means for imparting an oscillatory motion to the oscillatory mirror proportional to the change of range of an object in relation to the station of observation, and means for effecting a rotary movement about the datum position between the image and the surface corresponding to the change of bearing of the object in relation to the station of observation.

8. A table having a surface, a datum position on the surface representing a station of observation, in combination with a source of light and means for producing an image of the source of light, an oscillatory mirror set to revolve about an axis perpendicular to the surface and passing through the datum position upon which mirror the rays forming the image are projected and by which they are reflected, a second mirror mounted at a distance from the axis and arranged to reflect the image upon the aforesaid surface, means for imparting an oscillatory motion to the oscillatory mirror proportional to the change of range of an object in relation to the station of observation, and means for effecting a rotary movement of the two mirrors about the axis passing through the datum position and perpendicular to the suface, corresponding to the change of bearing of the object in relation to the station of observation.

9. A table having a surface and a datum position on the surface representing a station of observation, an optical projector mounted with its axis perpendicular to the plane of the surface and passing through the datum position, in combination with means for projecting an image of a mark produced by the projector upon the aforesaid surface, associated with means for effecting a movement between the image and the surface, consisting of two motions corresponding to the change of bearing and proportional to the change of range of an object in relation to the aforesaid station of observation.

In testimony whereof we have signed our names to this specification in the presence of two subscribing witnesses.

ARCHIBALD BARR.
WILLIAM STROUD.

Witnesses:
OLIVER HAYWARD PORTER,
HAROLD DRINKWATER JACKSON.